(12) United States Patent
Bai et al.

(10) Patent No.: US 10,838,423 B2
(45) Date of Patent: Nov. 17, 2020

(54) INTELLIGENT VEHICLE NAVIGATION SYSTEMS, METHODS, AND CONTROL LOGIC FOR DERIVING ROAD SEGMENT SPEED LIMITS

(71) Applicant: GM Global Technology Operations LLC, Detroit, MI (US)

(72) Inventors: Fan Bai, Ann Arbor, MI (US); Shu Chen, Rochester Hills, MI (US); Donald K. Grimm, Utica, MI (US); David E. Bojanowski, Clarkston, MI (US); Bo Yu, Warren, MI (US); Jinzhu Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 16/142,680

(22) Filed: Sep. 26, 2018

(65) Prior Publication Data

US 2020/0050209 A1 Feb. 13, 2020

Related U.S. Application Data

(60) Provisional application No. 62/715,511, filed on Aug. 7, 2018.

(51) Int. Cl.
*G05D 1/02* (2020.01)
*G08G 1/0967* (2006.01)
(Continued)

(52) U.S. Cl.
CPC ....... *G05D 1/0223* (2013.01); *B60K 31/0058* (2013.01); *B60W 30/143* (2013.01);
(Continued)

(58) Field of Classification Search
CPC .. G05D 1/0223; G05D 1/0276; G05D 1/0088; G05D 2201/0213; G08G 1/0967;
(Continued)

(56) References Cited

U.S. PATENT DOCUMENTS 6,356,838 B1 3/2002 Paul
6,697,730 B2 2/2004 Dickerson
(Continued)

FOREIGN PATENT DOCUMENTS

CN 103303143 A * 9/2013
DE 102014016567 A1 5/2016

OTHER PUBLICATIONS

English Translation: Chen, Chinese Patent Publication CN 103303143 A, Sep. 2013, Chinese Patent Office Publication (Year: 2013).*

*Primary Examiner* — Nadeem Odeh
(74) *Attorney, Agent, or Firm* — Quinn IP Law

(57) ABSTRACT

Presented are systems and methods for deriving speed limits of designated road segments by mining large-scale vehicle data traces. A method for controlling operation of a motor vehicle includes: determining a current location of the vehicle; determining a designated road segment corresponding to the vehicle's location; receiving host speed data indicative of the vehicle's speed while travelling on the road segment for a calibrated timeframe; receiving crowd-sourced speed data indicative of the speeds of participatory vehicles while travelling on the road segment for the calibrated timeframe; accumulating a speed distribution function for the road segment based on the host and crowd-sourced speed data; generating a finite mixture model from the speed distribution function to estimate a speed limit range; selecting a speed limit candidate from the estimated speed limit range; and transmitting command signals to a
(Continued)

vehicle subsystem to execute a control operation based on the selected speed limit candidate.

20 Claims, 3 Drawing Sheets

(51) Int. Cl.
*G01C 21/34* (2006.01)
*B60W 30/14* (2006.01)
*G05D 1/00* (2006.01)
*B60K 31/00* (2006.01)

(52) U.S. Cl.
CPC ....... *G01C 21/3492* (2013.01); *G05D 1/0088* (2013.01); *G05D 1/0276* (2013.01); *G08G 1/0967* (2013.01); *B60W 2555/60* (2020.02); *B60W 2556/45* (2020.02); *G05D 2201/0213* (2013.01)

(58) Field of Classification Search
CPC ........... B60W 30/143; B60W 2555/60; B60W 2556/45; G01C 21/3492; G01C 21/3691; G01C 21/3415; G01C 21/3461; B60K 31/0058
USPC .................................................. 701/24, 119
See application file for complete search history.

(56) References Cited

U.S. PATENT DOCUMENTS

| | | | |
|---|---|---|---|
| 7,266,438 B2 | 9/2007 | Kellum et al. | |
| 7,589,643 B2 | 9/2009 | Dagci et al. | |
| 7,739,036 B2 | 6/2010 | Grimm et al. | |
| 7,840,427 B2 | 11/2010 | O'Sullivan | |
| 8,050,855 B2 | 11/2011 | Coy et al. | |
| 8,170,739 B2 | 5/2012 | Lee | |
| 8,428,843 B2 | 4/2013 | Lee et al. | |
| 8,612,139 B2 | 12/2013 | Wang et al. | |
| 8,849,515 B2 | 9/2014 | Moshchuk et al. | |
| 8,996,273 B2 | 3/2015 | Lee et al. | |
| 9,014,915 B2 | 4/2015 | Chatterjee et al. | |
| 9,099,006 B2 | 8/2015 | Mudalige et al. | |
| 9,229,453 B1 | 1/2016 | Lee | |
| 9,283,967 B2 | 3/2016 | Lee | |
| 9,424,745 B1* | 8/2016 | Kagoshima | G08G 1/052 |
| 9,487,212 B1 | 11/2016 | Adam et al. | |
| 9,868,443 B2 | 1/2018 | Zeng et al. | |
| 10,109,184 B2* | 10/2018 | Fowe | G08G 1/052 |
| 2009/0030885 A1 | 1/2009 | DePasquale et al. | |
| 2010/0228415 A1 | 9/2010 | Paul | |
| 2011/0059693 A1 | 3/2011 | O'Sullivan | |
| 2011/0313880 A1 | 12/2011 | Paul et al. | |
| 2012/0059574 A1* | 3/2012 | Hada | G08G 1/0133 701/119 |
| 2012/0101713 A1 | 4/2012 | Moshohuk et al. | |
| 2012/0239452 A1 | 9/2012 | Trivedi et al. | |
| 2013/0032421 A1 | 2/2013 | Bonne et al. | |
| 2013/0035821 A1 | 2/2013 | Bonne et al. | |
| 2013/0054128 A1 | 2/2013 | Moshchuk et al. | |
| 2013/0204676 A1 | 8/2013 | Hindi et al. | |
| 2013/0219294 A1 | 8/2013 | Goldman-Shenhar et al. | |
| 2014/0011522 A1 | 1/2014 | Lin et al. | |
| 2015/0057831 A1* | 2/2015 | Finlow-Bates | G08G 1/09626 701/1 |
| 2015/0353082 A1 | 12/2015 | Lee et al. | |
| 2015/0353085 A1 | 12/2015 | Lee | |
| 2016/0104376 A1* | 4/2016 | Fowe | G08G 1/0129 701/119 |
| 2016/0231124 A1 | 8/2016 | Nickolaou et al. | |
| 2016/0320194 A1 | 11/2016 | Liu et al. | |
| 2016/0320195 A1 | 11/2016 | Liu et al. | |
| 2016/0320198 A1 | 11/2016 | Liu et al. | |
| 2016/0321566 A1 | 11/2016 | Liu et al. | |
| 2016/0321771 A1 | 11/2016 | Liu et al. | |
| 2017/0021830 A1 | 1/2017 | Feldman et al. | |

* cited by examiner

INTELLIGENT VEHICLE NAVIGATION SYSTEMS, METHODS, AND CONTROL LOGIC FOR DERIVING ROAD SEGMENT SPEED LIMITS

CLAIM OF PRIORITY AND CROSS-REFERENCE TO RELATED APPLICATION

This application claims the benefit of, and priority to, U.S. Provisional Patent Application No. 62/715,511, which was filed on Aug. 7, 2018, and is incorporated herein by reference in its entirety and for all purposes.

INTRODUCTION

The present disclosure relates generally to vehicle navigation systems with speed limit monitoring capabilities. More specifically, aspects of this disclosure relate to intelligent navigation systems and control logic for deriving speed limits of road segments.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system, which allows a vehicle operator to set a particular vehicle speed and have the onboard vehicle computer system maintain that speed without the driver operating the accelerator or brake pedals. Next-generation Adaptive Cruise Control (ACC) is a computer-automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Departure and Automated Steering ("Auto Steer") Systems, and other Advanced Driver Assistance Systems (ADAS) and autonomous driving features are also available on many modern-day automobiles.

As vehicle processing, communication, and sensing capabilities continue to improve, manufacturers will persist in offering more system-automated driving capabilities with the aspiration of eventually offering fully autonomous vehicles competent to operate among heterogeneous vehicle types in both urban and rural scenarios. Original equipment manufacturers (OEM) are moving towards Vehicle-to-Vehicle (V2V) and Vehicle-to-Infrastructure (V2I) "talking" cars with higher-level driving automation features that employ autonomous steering, braking, and powertrain systems to enable driverless vehicle operation. Automated route generation systems utilize vehicle state and dynamics sensors, roadway map and condition data, and path prediction algorithms to provide vehicle routing with automated lane center and lane change forecasting, scenario planning, etc. Computer-assisted rerouting techniques predict alternative travel routes that may be updated, for example, based on real-time and virtual vehicle data.

Speed limits and driving conditions along a given vehicle route may change frequently or unexpectedly, particularly in urban settings. For instance, time-dependent speed limits change along a given route according to the time of day, such as during school hours or rush hours, while variable-dependent speed limits change according to designated conditions, such as construction zones and inclement weather. Many automobiles are now equipped with a global positioning system (GPS) transceiver and navigation software with a mapping database to obtain speed limit information associated with the vehicle's current location. ADAS and autonomous driving systems are often able to adapt certain automated driving maneuvers based on speed limit information obtained by the in-vehicle navigation system. However, speed limit information stored in the mapping database may become outdated and, even if periodically updated, may not reflect time-dependent or variable-dependent changes in speed limits. Additionally, employing a fleet of survey vehicles to update database-stored speed limit information is extremely costly and time consuming.

SUMMARY

Disclosed herein are intelligent vehicle navigation systems and attendant control logic for deriving road segment speed limits, methods for manufacturing and methods for operating such systems, and motor vehicles with intelligent navigation systems having speed limit assessment capabilities. By way of example, there are presented novel systems and methods for deriving a speed limit of a designated road segment via mining of large-scale vehicle data traces. A method for deriving a maximum (or minimum) legal speed limit of a particular road segment utilizes statistical analysis of crowd-sensed vehicle data, examining a probability distribution of actual vehicle driving speed data generated by a large volume of vehicles driving on the road segment over a calibrated timeframe. Disclosed statistical techniques enable accurate, real-time speed limit retrieval using contributing vehicles as sensors. Verified speed limit values are transparent to traffic flow conditions and generally impervious to obsolescence. Additionally, crowdsourcing data from a random or a discriminate segment of a large, open group of participating vehicles helps to eliminate the need for dedicated survey vehicles and, thus, significantly reduces the time and costs associated with updating database-stored speed limit data. In addition to provisioning less costly, more timely updates, disclosed systems and methods help to improve ADAS and autonomous driving functionality.

Aspects of this disclosure are directed to probabilistic modeling techniques and computer-executable algorithms for estimating one or more distinct parameters of an observable dynamic driving environment. For instance, a method is presented for modulating a controller-regulated operation of a motor vehicle based on a road segment speed limit derived through statistical analysis of vehicle speed data traces. A representative method includes, in any order and in any combination with any of the above and below disclosed options and features: determining, via a resident vehicle controller of a motor vehicle, e.g., through cooperative operation with a GPS transceiver, cellular data chip, etc., a current vehicle location of the motor vehicle; determining, via the resident vehicle controller, e.g., through cooperative operation with a resident vehicle navigation module or a remote third-party navigation data provider, a designated road segment that corresponds to the vehicle's current location; receiving, by the resident vehicle controller from a resident or remote memory device storing a map database, a stored speed limit assigned to the designated road segment; and receiving, e.g., by the resident vehicle controller from a powertrain control module and/or a dedicated wheel speed sensor or sensors, host vehicle speed data indicative of the motor vehicle's speed(s) while travelling on the designated road segment for a calibrated timeframe.

Continuing with the above example, the method may further comprise: receiving, e.g., by a high-speed, server-class computer of a host cloud computing platform, the host vehicle speed data and crowd-sourced speed data indicative of the vehicle speeds of multiple participatory vehicles while travelling on the designated road segment for the calibrated timeframe; accumulating a statistical speed distribution function (e.g., hourly, daily, weekly, etc.) for the designated road segment based on the received host vehicle speed data and crowd-sourced speed data; generating a finite mixture model from the statistical speed distribution function to estimate a speed limit range for the designated road segment; and, selecting a speed limit candidate from the estimated speed limit range. The vehicle controller responsively transmits a command signal to a resident vehicle subsystem to execute a control operation based on the selected speed limit candidate.

Other aspects of the present disclosure are directed to intelligent vehicle navigation systems for deriving road segment speed limits through statistical analysis of crowd-sensed data aggregated from multiple participatory motor vehicles. As used herein, the term "motor vehicle" may include any relevant vehicle platform, such as passenger vehicles (internal combustion engine, hybrid, full electric, fuel cell, etc.), commercial vehicles, industrial vehicles, tracked vehicles, off-road and all-terrain vehicles (ATV), motorcycles, etc. In addition, the terms "assisted" and "automated" and "autonomous" may be used with respect to any relevant vehicle platform that may be classified as a Society of Automotive Engineers (SAE) Level 2, 3, 4 or 5 vehicle. SAE Level 0, for example, is generally typified as "unassisted" driving that allows for vehicle-generated warnings with momentary intervention, but otherwise relies solely on human control. By comparison, SAE Level 3 allows for unassisted, partially assisted, and fully autonomous driving with sufficient vehicle automation for full vehicle control (steering, speed, acceleration/deceleration, etc.), while obliging driver intervention within a calibrated timeframe. At the upper end of the spectrum is Level 5 automation that altogether eliminates human intervention (e.g., no steering wheel, gas pedal, or shift knob).

In an example, an intelligent vehicle navigation system includes a remote system server computer operable to communicate with multiple motor vehicles. Each motor vehicle includes a vehicle body, a vehicle powertrain attached to and operable for propelling the vehicle body, and a vehicle navigation system with a location tracking device and a graphical human machine interface (HMI) attached to the vehicle body. A resident vehicle controller is attached to the vehicle body and operatively connected to the vehicle powertrain and navigation system. The resident vehicle controller is programmed to execute memory-stored instructions to: determine, via the location tracking device of the vehicle navigation system, the motor vehicle's current location; determine a designated road segment that corresponds to the vehicle's current location; and generate host vehicle speed data indicative of a vehicle speed of the motor vehicle while travelling on the designated road segment for a calibrated timeframe.

Continuing with the above example, the remote system server computer is programmed to execute memory-stored instructions to: receive respective vehicle speed data from each of the participating motor vehicles; accumulate a statistical speed distribution function for the designated road segment based on the received, crowd-sourced speed data; generate a finite mixture model from the statistical speed distribution function to estimate a speed limit range for the designated road segment; and select a speed limit candidate from the estimated speed limit range. The resident vehicle controller is operable to receive the selected speed limit candidate from the remote system server computer; the controller responsively transmits a command signal to a resident vehicle subsystem to execute a control operation based on the speed limit candidate.

For any of the disclosed systems, methods, and vehicles, accumulating a statistical speed distribution function may include accumulating both a daily speed distribution function and an hourly speed distribution function for the designated road segment. As another option, generating the finite mixture model may include applying an expectation maximization algorithm to determine one or more mixture model parameters corresponding to a class density and a prior probability of the finite mixture model. In addition, a K-value indicative of a number of components for the finite mixture model may be determined based on the statistical speed distribution function. In this instance, the K-value may be equal to n, and generating the finite mixture model may include generating n finite mixture models for the designated road segment.

For any of the disclosed systems, methods, and vehicles, a plurality of hypothesized speed limit candidates may be selected from the estimated speed limit range, and a maximal likelihood test may be applied to each hypothesized speed limit candidate to thereby select the speed limit candidate for the designated road segment. Optionally, the finite mixture model may include a weighted sum of multiple multi-dimensional Gaussian probability density functions. One or more or all of the disclosed operations may be executed by a resident vehicle controller, a remote host server computer, or other suitable computing device, or any combination thereof. In a cloud-centric architecture, the resident vehicle controller calculates a random probability value, determines if this random probability value is greater than a calibrated threshold value and, if so, responsively transmits the host vehicle speed data to a remote system server computer off-board from the motor vehicle. As yet another option, the resident vehicle controller may evaluate a criteria set, which includes one or more neighborhood density criteria, one or more road vehicle density profile criteria, one or more vehicle self-kinematic profile criteria, and/or one or more time relevance criteria. In this instance, the evaluated criteria set may be processed with a collaborative filter using a logistic regression technique.

For any of the disclosed systems, methods, and vehicles, the resident vehicle subsystem is an Adaptive Cruise Control (ACC) system or other ADAS control module. in this instance, the control operation includes the ACC/ADAS increasing (or decreasing) the vehicle's current speed to more closely align with the selected speed limit candidate or a derived normative driving speed for the current road segment. For instance, the vehicle controller may select a modified driving speed (reduce current driving speed from 78 mph to 73 mph) that is associated with a posted legal speed limit (70 mph) but closer to an FMM derived estimate (e.g., 72 mph). The system may also apply a user-selected delta (e.g., X mph or Y percent) to a derived speed value and operate the vehicle at that speed. In addition, or alternatively, the control operation may include a resident vehicle navigation system saving the selected speed limit candidate over a stored speed limit in the memory-stored map database. The graphical HMI or other suitable in-vehicle display device may be operable to display the selected speed limit candidate. A derived speed limit may be used as an advisory speed indication, e.g., for highway on and off-ramps because ramp speed limits are typically not captured in map databases. This approach can be used to indicate an advised curve speed (e.g., by displaying a yellow diamond on an in-vehicle display); the advised curve speed can be used by a control system for curve control purposes. By extension, different advisory values may be associated based on other types of variable analysis: nighttime, adverse weather conditions, vehicle type, etc.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
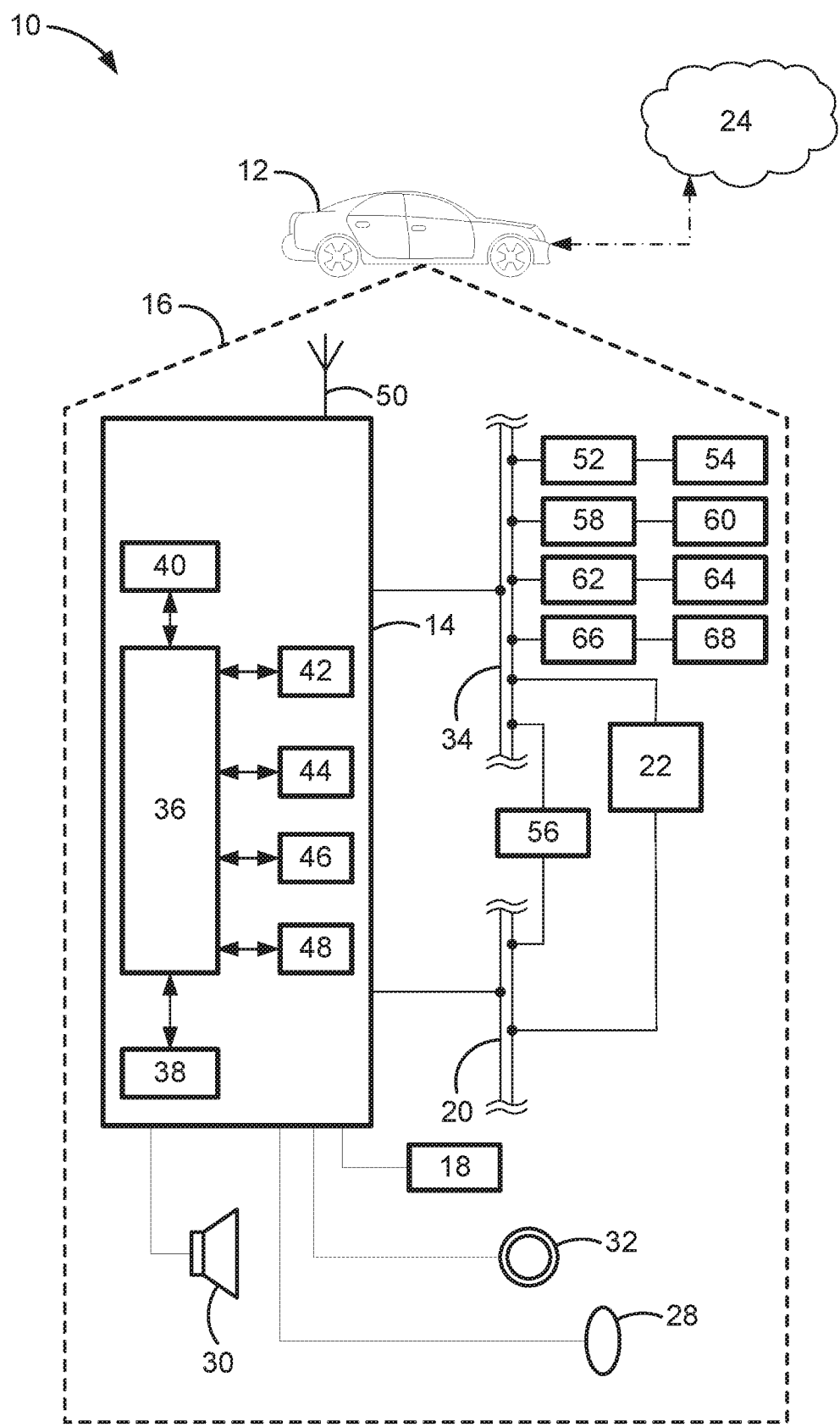
FIG. 1 is a schematic illustration of a representative motor vehicle with a network of in-vehicle controllers, sensing devices, and communication devices for executing automated and/or autonomous driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these examples are provided as a representation of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a forward driving direction of a motor vehicle when the motor vehicle is operatively oriented on a normal driving surface.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more assisted or automated driving operations. The illustrated automobile 10—also referred to herein as "motor vehicle" or "vehicle" for short—is merely an exemplary application with which aspects and features of this disclosure may be practiced. In the same vein, implementation of the present concepts for the specific computing network architecture discussed below should also be appreciated as an exemplary application of the novel features disclosed herein. As such, it will be understood that aspects and features of this disclosure may be applied to other system architectures, utilized for various automated driving operations, and implemented for any logically relevant type of motor vehicle. Moreover, only select components of the network and vehicle have been shown and will be described in detail below. Nevertheless, the vehicles and networks discussed herein may include numerous additional and alternative features, and other available peripheral components, for example, for carrying out the various methods and functions of this disclosure. Lastly, the drawings presented herein are not necessarily to scale and are provided purely for instructional purposes. Thus, the specific and relative dimensions shown in the drawings are not to be construed as limiting.

The representative vehicle 10 of FIG. 1 is originally equipped with a vehicle telecommunication and information ("telematics") unit 14 that wirelessly communicates (e.g., via cell towers, base stations, V2X, and/or mobile switching centers (MSCs), etc.) with a remotely located or "off-board" cloud computing system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, trackpads, keyboards, touchscreens, etc.). Generally, these hardware components 16 function, at least in part, as a resident vehicle navigation system, e.g., to enable assisted and/or automated vehicle navigation, and as a human/machine interface (HMI), e.g., to enable a user to communicate with the telematics unit 14 and other systems and system components of the vehicle 10. Microphone 28 provides a vehicle occupant with means to input verbal or other auditory commands; the vehicle 10 may be equipped with an embedded voice-processing unit programmed with a computational speech recognition software module. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an ADAS electronic control unit (ECU) 52, an engine control module (ECM) 54, a powertrain control module (PCM) 56, sensor interface module(s) 58, a brake system control module (B SCM) 60, and assorted other vehicle ECUs and control modules, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), a dedicated control module, etc. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communications devices described above may be configured to exchange data as part of a periodic broadcast in a V2V communication system or other Vehicle-to-Everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo, radar, laser, ultrasonic, optical, infrared, or other suitable detection technology for executing an automated driving operation. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, electromagnetic, or light-based waves (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, an inertial measurement unit (IMU), etc., for detecting longitudinal and lateral acceleration, yaw, roll, and/or pitch rates, or other dynamics related parameters. Using data from the sensing devices 62, 64, 66, 68, the CPU 36 identifies objects within a detectable range of the vehicle 10, and determines attributes of the target object, such as size, relative position, angle of approach, relative speed, etc.

In general, disclosed systems, methods and devices help to derive a maximum (or minimum) legal speed limit of a specified road segment by examining a statistical probability distribution of actual vehicle driving speeds on that road segment for a designated timeframe. The vehicle driving speed data is generated, at least in part, by a large volume of vehicles participating as "crowd-sourced" sensors, e.g., using GPS information and vehicle controller area network bus (CANbus) data. At least some of the disclosed techniques for deriving road segment speed limits randomly select a subset of available crowd-source vehicles at any time in order to aggregate vehicle driving speed data. Optionally, at least some of the disclosed techniques for deriving road segment speed limits calculatingly select a given window of time and a subset of available crowd-source vehicles with one or more predetermined characteristics. Disclosed systems, methods and devices provide less costly and more timely speed limit updates, e.g., for mapping databases, vehicle navigation systems, and automated driving modules, as compared to employing a fleet of dedicated survey vehicles to update database-stored speed limit information. In addition, vehicle speed sensing may be made available across an entire retail fleet to provision high-penetration data aggregation capabilities, as compared to the relatively low penetration of camera or human-based speed limit signage detection.

Figure 2:
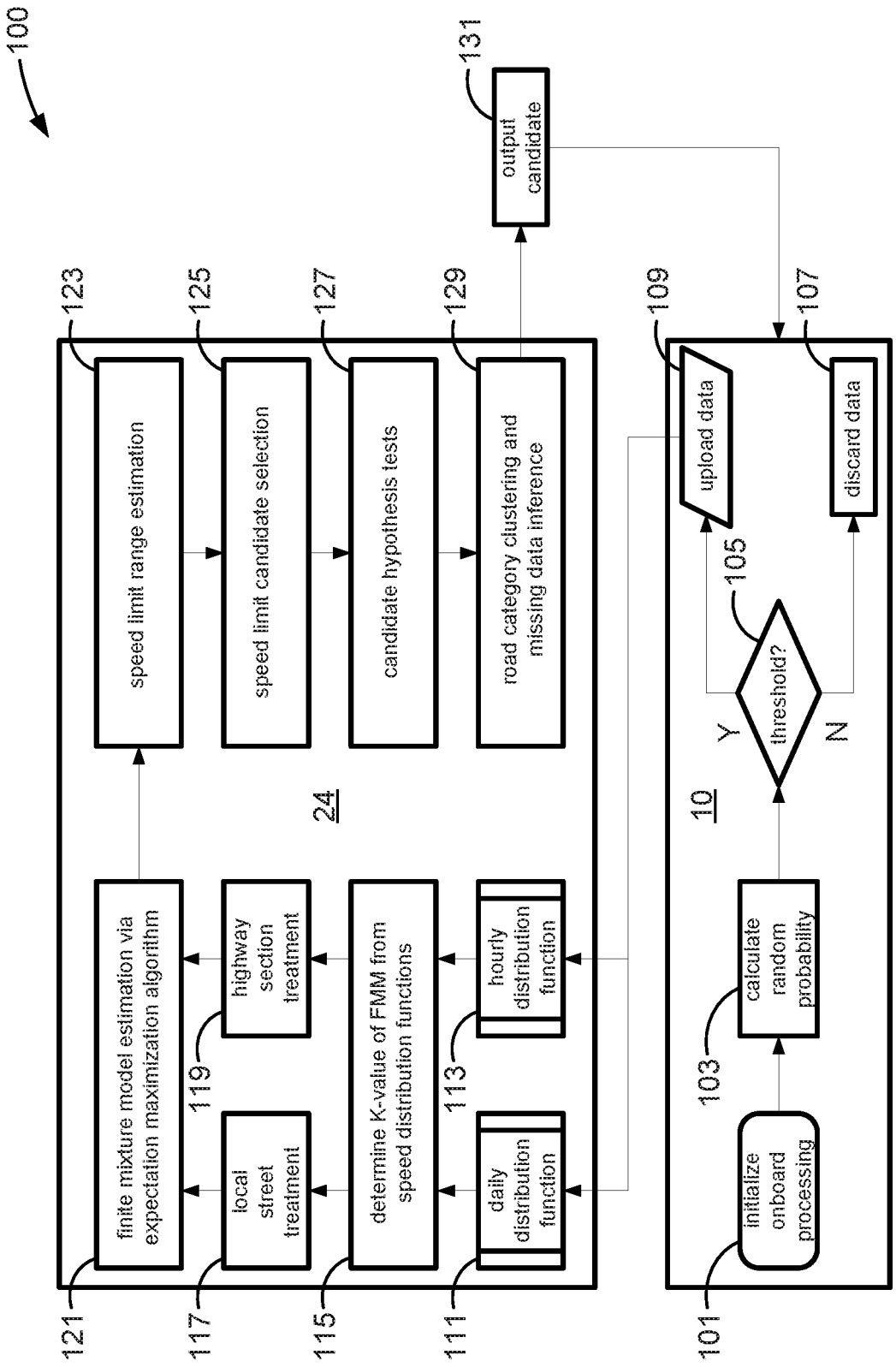
FIG. 2 is a flowchart for a cloud-centric, random-sampling algorithm for deriving road segment speed limits, which may correspond to memory-stored instructions executed by onboard or remote control-logic circuitry, programmable electronic control unit, or other computer-based device or network of devices in accord with aspects of the disclosed concepts.

With reference now to the flowchart of FIG. 2, an improved method or control strategy for deriving road segment speed limits using cloud-centric, random-sampling techniques is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

For random-sampling and discriminate-sampling techniques, a probability density function (PDF) distribution of vehicle speed on a particular road segment for a representative period is expected to vary with time (e.g., rush hour congestion vs. non-rush hour free flow; time-dependent school and construction zones, etc.), environment (e.g., urban vs. residential; highway vs. byway, etc.), and irrepressible factors (e.g., construction, collision, inclement weather, etc.). Maximum legal driving speed can be ascertained from the PDF distribution as a Finite Mixture Model (FMM) estimation to isolate one or more system-representative parameters (e.g., construction and collision-free, non-rush hour, and/or free-flow components) from one or more non-representative parameters (e.g., snowy/rainy, rush hour, and/or congested/stopped components). For at least some implementations, a distribution function of vehicle speed may be represented as a final joint distribution g(x) and calculated as:

$$g(x) = \sum_m w_i P_i(x; \mu_i, \sigma_i)$$

where $$P_i(x; \mu_i, \sigma_i) = \frac{1}{(2\pi)^{1/2} \sigma_i} e^{[-\frac{1}{2}(x-\mu_i)\sigma_i^{-2}(x-\mu_i)]}$$

and where $w_i$ is a weighted factor given to a particular ith hidden component; $P_i$ is an individual component of a probability distribution function for each hidden component; x is a random PDF variable, in this case observed vehicle speed; $\mu_i$ is a mean of an ith hidden distribution function; and $\sigma_i$ is a standard deviation of the ith hidden distribution function. The final joint distribution g(x) can be segregated out into a stopped component $P_S(\mu_i, \sigma_i)$, a congested component $P_C(\mu_i, \sigma_i)$, and a free-flow component $P_F(\mu_i, \sigma_i)$.

During free-flow driving, it has been observed that drivers tend to exceed a posted legal maximum speed limit by an average value. For a given road segment with a posted speed limit of 40 miles per hour (mph), for example, empirical data shows drivers speed by an average of 6.12 mph. By comparison, for a given road segment with a posted speed limit of 70 mph, empirical data shows drivers speed by an average of 7.67 mph. To account for this trend, statistical values can be provided for a free-flow, sub-distribution model $(\mu_i, \delta_i)$ of the free-flow component $P_F(\mu_i, \sigma_i)$. A set of hypothesized speed limits is then selected from within a range $[\mu_i - 2\delta_i, \mu_i + 2\delta_i]$ as H0, H1, ... Hx. A maximal likelihood test is then run for each hypothesized speed limit.

A finite mixture model may be used to help classify observations of a given system, to adjust these observations for clustering, and to model unobserved heterogeneity. In finite mixture modeling, an observed data set may be assumed to belong to one or more unobserved subpopulations called classes; mixtures of probability densities or regression models may be used to model an outcome of interest. After fitting an FMM, class membership probabilities may be predicted for each observation. Observed distribution may look approximately normal, e.g., with a slight asymmetry. This asymmetry may occur because the distribution is a mixture of two normal densities—a left-hand density and a right-hand density—the latter of which skews the distribution to the right. An FMM may be employed to estimate means and variances of these two underlying densities along with their proportions in the overall population. More generally, FMMs may model mixtures containing any number of subpopulations, and these subpopulation-specific models need not be limited to a mixture of normal densities. FMMs often allow for mixtures of linear and generalized linear regression models, including models for binary, ordinal, nominal, and count responses, and may allow the inclusion of covariates with subpopulation-specific effects. Inferences may be made about each subpopulation, and individual observations may be classified into a subpopulation.

In accord with at least some implementations, an expectation-maximization (EM) algorithm may be applied as an iterative process to fit an FMM by identifying parameters of a mixture with an a priori number of components. By way of non-limiting example, an EM algorithm may be employed as a general technique for finding one or more maximum likelihood estimates when missing values or latent variables are present. In instances where the EM is applied as an iterative algorithm, the iterations may alternate between performing an expectation (E) step, which may generate a function for the expectation of a log-likelihood evaluated using a current estimate for the parameters, and a maximization (M) step, which may compute one or more parameters maximizing an expected log-likelihood found in the E step. These parameter-estimates may then be employed to determine a distribution of one or more latent variables in a subsequent E step.

A challenge of Finite Mixture Model and Gaussian Mixture Model techniques is identifying how best to determine a number of components (k) to which N observed random variables are distributed for a mixture model. In a representative approach, the system may maintain a number of FMM models for a given road segment. For example, a Gaussian Mixture Model (GMM) may be represented as ($GMM_{k=1}$, $GMM_{k=2}$, $GMM_{k=3}$, . . . ), where $GMM_{k=1}$ is a Gaussian Mixture Model with one component. An objective for this determination may include finding a best model to which a data set most closely fits. As another option, an Iterative Cross Validation (ICV) method may be employed where a batch of data is received from a segment of participatory vehicles (e.g., past 14 days of vehicle speed data for a delineated segment of highway). The ICV method uses the received data and an information criterion to find a best fit model. There are various types of information criteria that may be utilized to find the best model, such as Akaike's Information Criterion, Bayesian Information Criterion, or other suitable estimator of the relative quality of statistical models for a given set of data. The selected model may be used in a next-step cloud algorithm for speed limit range estimation and candidate selection. The model may be "trained" with the newly received data and existing data; segments of outdated data may be excluded if deemed acceptable. OPENSTREETMAP® (OSM) databases have a portion of identified road segments that are labelled with speed limit information; this partial ground truth can be used to train/test an algorithm. A clustering/classification algorithm may be employed to identify different classes in a model; a consensus may be ascertained from OSM-labelled road segments from this class. This entire class may then be labelled with the derived speed limit value.

Method 100 begins at terminal block 101 with processor-executable instructions for a programmable controller or control module or similarly suitable processor to call up an initialization procedure for a random-sampling protocol to derive a speed limit of a road segment by applying statistical learning to crowd-sensed vehicle data to infer a maximum legal speed limit. This routine may be executed in real-time, continuously, systematically, sporadically and/or at regular intervals, for example, each 100 milliseconds, etc., during ongoing vehicle operation. As yet another option, terminal block 101 may initialize responsive to a broadcast prompt signal received from a backend or middleware computing node tasked with collecting, analyzing, sorting, storing and distributing speed limit information. As part of the initialization procedure at block 101, resident vehicle CPU 36 and/or processor(s) 40 may execute an onboard processing code segment, e.g., to obtain vehicle data (e.g., location, speed, heading, acceleration, timestamp, etc.), initiate vehicle speed data collection, filter out obvious error and outliers in collected data, and provide data interpolation if certain data is deemed missing.

The method 100 of FIG. 2 proceeds to process block 103 with instructions to determine a random probability value, which is used to ascertain whether or not a particular set of vehicle speed data will be contributed for use in deriving a legal speed limit. A simple random sampling technique may be used to determine the random probability value, such as a random sort algorithm or a reservoir sampling algorithm. Alternatively, the CPU 36 may be equipped with a random number generator (RNG) module or may be communicatively connected to a hardware RNG for indiscriminately producing a random value. At decision block 105, the method 100 will determine whether or not the random probability value determined at block 103 meets or exceeds a calibrated threshold value. This threshold value may be a fixed probability value that is predetermined via an engineering calibration process. As another available option, the calibrated threshold value may be a dynamically adjusted probability value that is based on one or more predetermined factors (e.g., traffic volume, time of data collection, etc.). When traffic volumes are high, for example, a calibrated threshold probability value may be set to a relatively high value and, thus, only a small portion of participatory vehicles will upload data. Conversely, when traffic volumes are low, the probability value may be set to a relatively low number so substantially all participating vehicles on that given road segment will report data to help ensure a sufficiently sized data set is procured. If it is decided that the calibrated threshold value has not been met (block 105=NO), the method proceeds to process block 107 and discards the data. At this juncture, the method 100 may circle back to terminal block 101 and run in a continuous loop or may temporarily terminate. Upon determining that the calibrated threshold value has been met or exceeded (block 105=YES), the method 100 proceeds to input/output block 109 and uploads the data.

With continuing reference to FIG. 2, the method 100 provides processor-executable instructions for a backend or middleware computing node, such as a remote system server computer of cloud computing system 24, to: (1) accumulate a daily speed distribution function at predefined process block 111; and (2) accumulate an hourly (rush or non-rush) speed distribution function at predefined process block 113. Assorted types of distribution functions may be used for accumulating a statistical speed distribution function, including a cumulative density function (CDF), a discrete density function (DDF), a joint probability density function (JPDF), etc. It may be desirable, for at least some implementations, to use a probability density function or a probability mass function (PMF) for predefined process blocks 111 and 113. At process block 115, the method determines a K-value for a finite mixture model from the accumulated distribution functions. The K-value is generally indicative of the number of components for a given FMM based on the accumulated distribution function. This K-value may be set equal to an integer n; in this case, the system may generate a total of n finite mixture models for a designated road segment.

Upon completion of the requisite speed distribution functions, the method 100 categorizes each resultant probabilistic model according to a classification of the road segment to which that model is associated. Using available OSM databases, for example, the method applies either a local street/byway treatment at process block 117 or a highway/expressway section treatment at process block 119. As a non-limiting example, most known road segments are labelled in OSM with a corresponding road category, such as highway, local main street, local small street, residential, etc. After establishing the appropriate category for a particular road segment, the method 100 applies a category-specific K-value to run the FMM. For illustrative purposes, a road segment categorized as a highway may be automatically assigned a K-value of 2, whereas a road segment categorized as a local street may be automatically assigned a K-value of 3. The method 100 then proceeds to process block 121 and executes a finite mixture model estimation using an expectation maximization algorithm as described above.

After concluding the FMM estimation and EM algorithm at block 121, the method 100 estimates a speed limit range at process block 123, and then selects one or more speed limit candidates at process block 125. Using FMM/GMM, the system is able to identify a number of hidden clusters of native/distinct probability distributions of speed limit for a designated road segment. For each cluster of this native/distinct probability distribution, the system may calculate a mean and standard deviation. In general, the system may wish to isolate the highest cluster, since it likely reflects the actual legal speed limit value. The system may look at the entire range and select therefrom those values that are multiples of five (5) and/or ten (10), acknowledging that almost all legal speed limits are also multiples of five or ten (e.g., 20 mph, 25 mph, 30 mph, . . . , 60 mph, 65 mph, 70 mph) rather than a value that is not a multiple of five or ten (e.g., 67 mph). The system may select actual speed limit values when the value is used for vehicle speed control purposes, e.g., where vehicle cruise control sets actual vehicle speed to a normative traffic speed.

Once the speed limit range estimation procedure of process block 123 is finished, and the speed limit candidate selection procedure of process block 125 is thereafter carried out, the method 100 will conduct candidate hypothesis tests at process block 127 and road category clustering and missing data inferences at process block 129. To select a final speed limit candidate, the method 100 may use a distinct set of data associated with the same road segment under investigation for the same time slot to run a hypothesis test against the selected subset of available candidates chosen at block 125. The value determined to have a highest statistical confidence will be assigned as the successful candidate. For road category clustering, the system may cluster together road segments within a common category (e.g., "Freeway Road" category; "Byway Road" category; "Expressway Road" category, etc.). If an aggregated data set for a particular freeway road is missing key data points or is deemed to be insufficient, the system can use the inferred speed limit(s) of other similarly categorized road segments to estimate what is the proper speed limit.

At process block 131, the final speed limit candidate is stored in a cloud computing service server stack and, when desired, broadcast to any or all networked vehicles. Each vehicle may then execute one or more vehicle control operations based on the received speed limit candidate. As one example, the control operation may include saving the selected speed limit candidate to a resident mapping database of the vehicle's onboard navigation system. The new speed limit may be displayed to the driver on the HMI of the vehicle telematics unit 14 each time the vehicle is passing over the corresponding road segment. Optionally, the speed limit may be output as a tactile, audible, and/or visual warning responsive to a determination by the CPU 36 that the driver is operating the vehicle 10 at an excessive speed on the designated road segment. As yet another option, the control operation may include executing one or more automated driving operations that are modulated responsive to the new memory-stored speed limit value. For instance, a resident Adaptive Cruise Control system may automatically increase or decrease the vehicle's current speed to more closely align actual speed with the selected speed limit candidate when travelling across the designated road segment. It is envisioned that any speed-dependent ADAS maneuver or speed-dependent autonomous driving maneuver can be modified based on the selected speed limit candidate.

Figure 3:
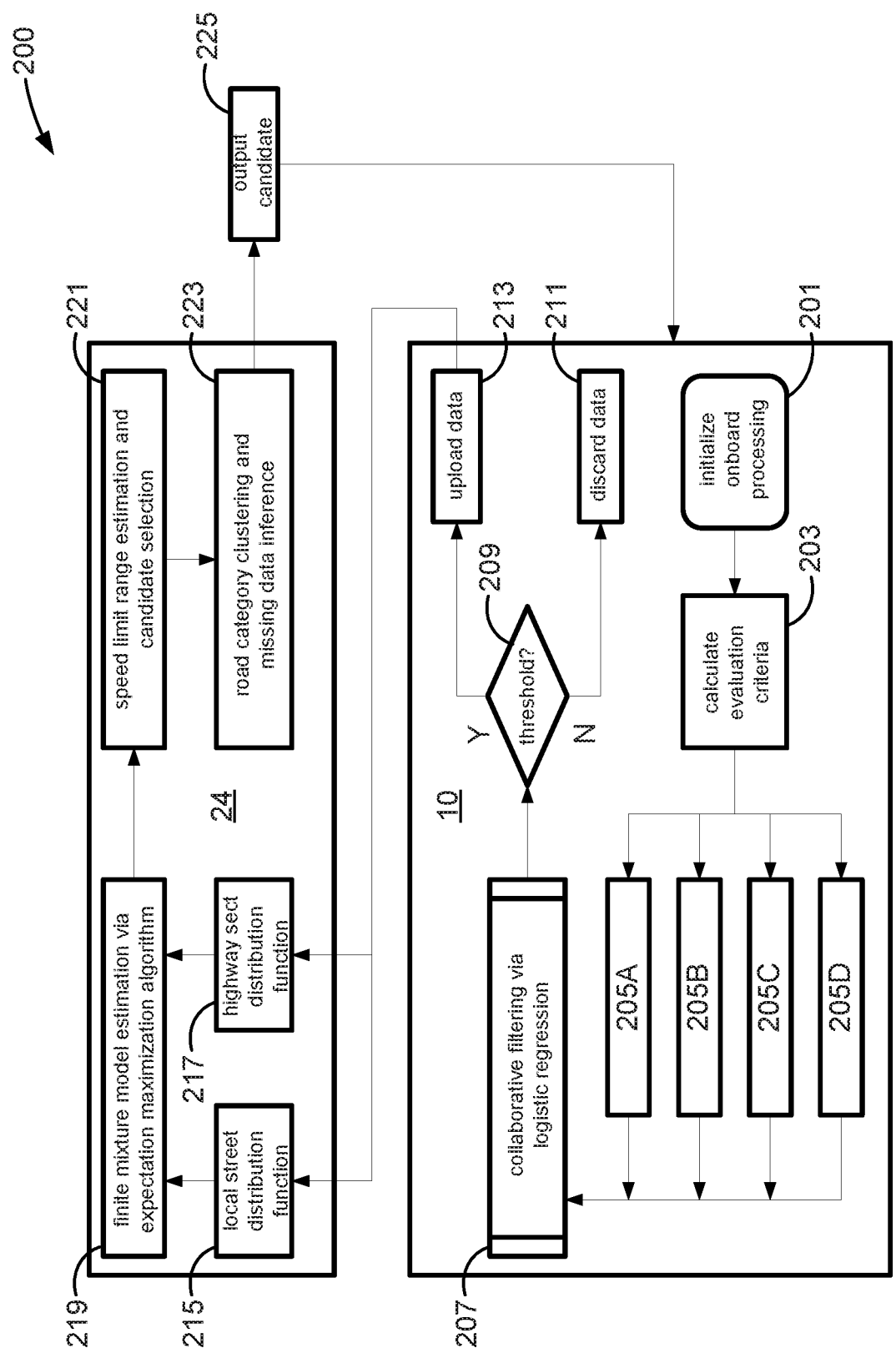
FIG. 3 is a flowchart for a vehicle-centric, discriminate-sampling algorithm for deriving road segment speed limits, which may correspond to memory-stored instructions executed by onboard or remote control-logic circuitry, programmable electronic control unit, or other computer-based device or network of devices in accord with aspects of the disclosed concepts.

With reference now to the flowchart of FIG. 3, an improved method or control strategy for deriving road segment speed limits using vehicle-centric, discriminate-sampling techniques is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Intended sampling techniques for deriving road segment speed limits may implement a collaborative filtering process to indirectly infer the relevance of each contribution of vehicle speed data for a designated road segment from a particular vehicle. The importance (probability) $p_i$ of an ith contribution of data can be determined by a logistic regression:

$$p_i(T_i, K_i, C_i, D_i) = \frac{1}{(1 + e^{(\alpha_1 T_i + \alpha_2 K_i + \alpha_3 C_i + \alpha_4 D_i)})}$$

where $T_i$ is a time relevance factor (e.g., the timeframe during which data was accumulated for a specific contribution is a non-rush hour period of time); $K_i$ is a vehicle self-kinematic factor (e.g., the vehicle speed profile is stable over time (no frequent acceleration/braking); the vehicle is operating standard or adaptive cruise control, etc.); $C_i$ is a vehicle self-clearance factor (e.g., the vehicle's Forward Collision Alert (FCA) system, Side Blind Zone Alert (SBZA) system, and/or Adaptive Cruise Control (ACC) system are indicating free flow traffic); $D_i$ is a vehicle neighborhood density factor (e.g., the vehicle is in a highly dense driving environment; the vehicle is in a rural driving environment, etc.). System parameters $\alpha_1, \alpha_2, \alpha_3, \alpha_4$ may be calculated using a rich set of training data. In some embodiments, $\alpha_1, \alpha_2, \alpha_3, \alpha_4$ may be used as a priori knowledge when employing a logistic regression to test the importance of a contribution of data.

Method 200 of FIG. 3 begins at terminal block 201 with processor-executable instructions for a programmable controller or control module or similarly suitable processor to call up an initialization procedure for a discriminate-sampling protocol to derive a speed limit of a road segment by applying statistical learning to crowd-sensed vehicle data to infer a maximum legal speed limit. Process block 201 of FIG. 3 may include any of the features and options described above with respect to process block 101 of FIG. 2. At process block 203, the method 200 establishes a set of evaluation criteria against which vehicle-generated data is gauged prior to uploading the data for modeling and maximization. In accord with the illustrated example, the motor vehicle's CPU 36 may evaluate neighborhood density criteria 205A, may evaluate road vehicle density/self-clearance profile criteria 205B, may evaluate vehicle self-kinematic profile criteria 205C, and/or may evaluate time relevance criteria 205D. Each of these individual factors is described above in the discussion of the importance (probability) $p_i$ assessment. The evaluated criteria set 205A-D is subsequently processed with a collaborative filter using a logistic regression technique at predefined process block 207.

At decision block 209, the method 200 determines whether or not a random probability value (e.g., determined in a manner similar to the process described above for block 103 of FIG. 2) meets or exceeds a calibrated threshold value. As explained above, this threshold value may be a fixed probability value that is predetermined via an engineering calibration process. As another available option, the calibrated threshold value may be a dynamically adjusted probability value that is based on one or more predetermined factors. If it is decided that the calibrated threshold value has not been met (block 209=NO), the method proceeds to process block 211 and discards the data. At this juncture, the method 200 may circle back to terminal block 201 and either run in a continuous loop or temporarily terminate. Upon determining that the calibrated threshold value has been met or exceeded (block 209=YES), the method 200 proceeds to input/output block 213 and uploads the current data set for processing and analysis.

With continuing reference to FIG. 3, the method 200 provides processor-executable instructions for a backend or middleware computing node, such as a remote system server computer of cloud computing resource 24, to: (1) accumulate a local street section speed distribution function at predefined process block 215; and (2) accumulate a highway section speed distribution function at predefined process block 217. Process blocks 215 and 217 of FIG. 3 may include any of the features and options described above with respect to process blocks 111 and 113 of FIG. 2. The method 100 then proceeds to process block 219 and executes a finite mixture model estimation using an expectation maximization algorithm as described above. Process block 219 of FIG. 3 may mimic any of the operations described above with respect process block 121 of FIG. 2. After concluding the FMM estimation and EM algorithm at block 219, the method 200 estimates a speed limit range and then selects one or more hypothesized speed limit candidates at process block 221. The method 200 thereafter conducts candidate hypothesis tests, road category clustering and missing data inferences at process block 223. Process blocks 221 and 223 of FIG. 3 may include any of the features and options described above with respect to process blocks 123, 125, 127 and 129 of FIG. 2. At process block 225, the final speed limit candidate is stored in a cloud server stack, and broadcast to select networked vehicles in the manner described above with respect to process block 131 of FIG. 2.

Aspects of this disclosure may be implemented, in some embodiments, through a computer-executable program of instructions, such as program modules, generally referred to as software applications or application programs executed by an onboard vehicle computer or a distributed network of resident and remote computing devices. Software may include, in non-limiting examples, routines, programs, objects, components, and data structures that perform particular tasks or implement particular data types. The software may form an interface to allow a resident vehicle controller or control module or other suitable integrated circuit device to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network architectures, including multiprocessor systems, microprocessor-based or programmable-consumer electronics, minicomputers, mainframe computers, master-slave, peer-to-peer, or parallel-computation frameworks, and the like. In addition, aspects of the present disclosure may be practiced in distributed-computing environments where tasks are performed by resident and remote-processing devices that are linked through a communications network. In a distributed-computing environment, program modules may be located in both onboard and off-board computer-storage media including memory storage devices. Aspects of the present disclosure may therefore, be implemented in connection with various hardware, software or a combination thereof, in a computer system or other processing system.

Any of the methods described herein may include machine-readable instructions for execution by: (a) a processor, (b) a controller, and/or (c) any other suitable processing device. Any algorithm, software, control logic, protocol, or method disclosed herein may be embodied in software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, there are many other methods for implementing the example machine readable instructions that may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle, the method comprising:
   determining, via a resident vehicle controller of the motor vehicle, a vehicle location of the motor vehicle;
   determining, via the resident vehicle controller, a designated road segment corresponding to the vehicle location;
   receiving, by the resident vehicle controller from a memory-stored map database, a stored speed limit assigned to the designated road segment;
   receiving host vehicle speed data indicative of a vehicle speed of the motor vehicle while travelling on the designated road segment for a calibrated timeframe;
   receiving crowd-sourced speed data indicative of vehicle speeds of multiple participatory vehicles while travelling on the designated road segment for the calibrated timeframe;
   accumulating a statistical speed distribution function for the designated road segment based on the received host vehicle speed data and the received crowd-sourced speed data;
   generating a finite mixture model from the statistical speed distribution function to estimate a speed limit range for the designated road segment;
   selecting a speed limit candidate from the estimated speed limit range; and
   transmitting, via the resident vehicle controller, a command signal to a resident vehicle subsystem of the motor vehicle to execute a control operation based on the selected speed limit candidate.

2. The method of claim 1, wherein accumulating the statistical speed distribution function includes accumulating a daily speed distribution function and an hourly speed distribution function for the designated road segment.

3. The method of claim 1, wherein generating the finite mixture model includes applying an expectation maximization algorithm to determine one or more mixture model parameters corresponding to a class density and a prior probability of the finite mixture model.

4. The method of claim 1, further comprising determining a K-value indicative of a number of components for the finite mixture model based on the statistical speed distribution function.

5. The method of claim 4, wherein the K-value is equal to n, and wherein generating the finite mixture model includes generating n finite mixture models for the designated road segment.

6. The method of claim 1, wherein the statistical speed distribution function is represented as $g(x)$ and is calculated as:

$$g(x) = \sum_m w_i P_i(x; \mu_i, \sigma_i)$$

where $$P_i(x; \mu_i, \sigma_i) = \frac{1}{(2\pi)^{1/2}\sqrt{\sigma_i}} e^{[-\frac{1}{2}(x-\mu_i)\sigma_i^{-1}(x-\mu_i)]}$$

and where $w_i$ is a weighted factor given to a particular ith hidden component; $P_i$ is an individual component of a probabilistic distribution function for each hidden component; x is an observed vehicle speed; $\mu_i$ is a mean of an ith hidden distribution function; and $\sigma_i$ is a standard deviation of the ith hidden distribution function.

7. The method of claim 1, further comprising:
selecting a plurality of hypothesized speed limit candidates from the estimated speed limit range; and
applying a maximal likelihood test to each of the hypothesized speed limit candidates to thereby select the speed limit candidate for the designated road segment.

8. The method of claim 1, wherein the finite mixture model includes a weighted sum of multiple multi-dimensional Gaussian probability density functions.

9. The method of claim 1, wherein receiving the host vehicle speed data, receiving the crowd-sourced speed data, accumulating the statistical speed distribution function, generating the finite mixture model, and selecting the speed limit candidate are executed by a remote system server computer off-board from the motor vehicle.

10. The method of claim 1, further comprising:
calculating, via the resident vehicle controller, a random probability value;
determining if the random probability value is greater than a calibrated threshold value; and
responsive to the random probability value being greater than the calibrated threshold value, transmitting the host vehicle speed data to a remote system server computer off-board from the motor vehicle.

11. The method of claim 1, further comprising evaluating a criteria set via the resident vehicle controller, the criteria set including one or more neighborhood density criteria, one or more road vehicle density profile criteria, one or more vehicle self-kinematic profile criteria, and/or one or more time relevance criteria.

12. The method of claim 11, further comprising processing the evaluated criteria set with a collaborative filter using a logistic regression technique.

13. The method of claim 1, wherein the resident vehicle subsystem includes an Adaptive Cruise Control (ACC) system, and wherein the control operation includes increasing or decreasing a current speed of the motor vehicle to more closely align with the selected speed limit candidate.

14. The method of claim 1, wherein the resident vehicle subsystem includes a vehicle navigation system with an electronic display device, and wherein the control operation includes saving the selected speed limit candidate over the stored speed limit in the memory-stored map database and displaying the selected speed limit candidate via the electronic display device.

15. An intelligent vehicle navigation system comprising:
a motor vehicle with a vehicle body, a vehicle navigation system with a location tracking device and an electronic display device attached to the vehicle body, and a resident vehicle controller attached to the vehicle body and operatively connected to the vehicle navigation system, the resident vehicle controller being configured to:
determine, via the location tracking device of the vehicle navigation system, a vehicle location of the motor vehicle;
determine a designated road segment corresponding to the vehicle location; and
determine host vehicle speed data indicative of a vehicle speed of the motor vehicle while travelling on the designated road segment for a calibrated timeframe; and
a remote system server computer operable to communicate with the motor vehicle, the remote system server computer being configured to:
receive the host vehicle speed data from the motor vehicle;
receive crowd-sourced speed data indicative of vehicle speeds of multiple participatory vehicles while travelling on the designated road segment for the calibrated timeframe;
accumulate a statistical speed distribution function for the designated road segment based on the host vehicle speed data and the crowd-sourced speed data;
generate a finite mixture model from the statistical speed distribution function to estimate a speed limit range for the designated road segment; and
select a speed limit candidate from the estimated speed limit range,
wherein the resident vehicle controller is operable to receive the selected speed limit candidate from the remote system server computer and responsively transmit a command signal to a resident vehicle subsystem of the motor vehicle to execute a control operation based on the speed limit candidate.

16. The intelligent vehicle navigation system of claim 15, wherein accumulating the statistical speed distribution function includes accumulating a daily speed distribution function and an hourly speed distribution function for the designated road segment.

17. The intelligent vehicle navigation system of claim 15, wherein generating the finite mixture model includes applying an expectation maximization algorithm to determine one or more mixture model parameters corresponding to a class density and a prior probability of the finite mixture model.

18. The intelligent vehicle navigation system of claim 15, wherein the remote system server computer is further configured to determine a K-value indicative of a number of components for the finite mixture model based on the statistical speed distribution function.

19. The intelligent vehicle navigation system of claim 18, wherein the K-value is equal to n, and wherein generating the finite mixture model includes generating n finite mixture models for the designated road segment.

20. The intelligent vehicle navigation system of claim 15, wherein the finite mixture model includes a weighted sum of multiple multi-dimensional Gaussian probability density functions.

* * * * *